United States Patent [19]
Smith et al.

[11] Patent Number: 5,887,452
[45] Date of Patent: Mar. 30, 1999

[54] KNITTED COVER

[75] Inventors: Stuart Thomas Smith, Port Huron; Debra Jean Tiensivu, Clinton Township, both of Mich.

[73] Assignee: Lear Corporation, Southfield, Mich.

[21] Appl. No.: 705,030

[22] Filed: Aug. 29, 1996

[51] Int. Cl.$^6$ .................................................. D04B 1/22
[52] U.S. Cl. .............................................. 66/170; 66/196
[58] Field of Search ............................ 66/196, 197, 198, 66/170, 171, 202, 190, 194; 297/218.1, 218.4

[56] References Cited

U.S. PATENT DOCUMENTS

| | | | |
|---|---|---|---|
| 4,660,888 | 4/1987 | Urai | 297/452 |
| 5,213,863 | 5/1993 | Day et al. | 428/71 |
| 5,308,141 | 5/1994 | Robinson et al. | 297/218 |
| 5,326,150 | 7/1994 | Robinson et al. | 297/218 |
| 5,428,969 | 7/1995 | Day et al. | 66/202 |

FOREIGN PATENT DOCUMENTS

| | | |
|---|---|---|
| 2223034A | 3/1990 | United Kingdom . |
| 2295162A | 5/1996 | United Kingdom . |

*Primary Examiner*—Michael A. Neas
*Assistant Examiner*—Larry D. Worrell, Jr.
*Attorney, Agent, or Firm*—Brooks & Kushman P.C.

[57] ABSTRACT

A method of forming a weft knitted fabric upholstery cover having a wale-wise extending flap on its reverse side in which method the excess fabric is knitted coursewise into the cover and is gathered into a flap on the reverse side of the fabric and sewn along its length. The coursewise length of the cover is sufficient so that after gathering to form the flap, the cover is substantially an exact fit over the core.

8 Claims, 6 Drawing Sheets

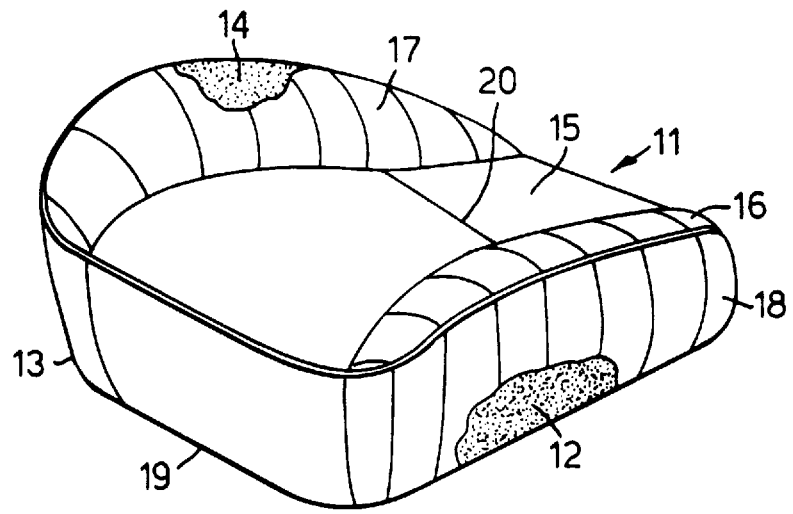
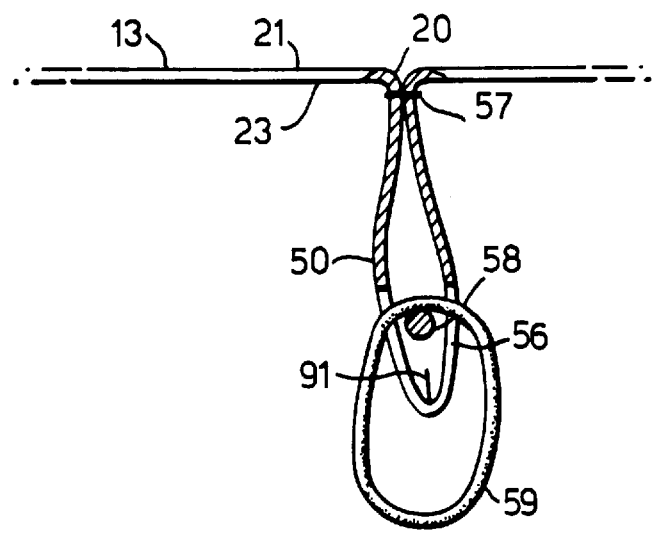

KNITTED COVER

TECHNICAL FIELD

This invention relates to knitted fabric upholstery covers and in particular to covers for use on seats.

BACKGROUND OF THE INVENTION

It has recently been found possible to knit one-piece upholstery covers for covering three-dimensional objects. U.S. Pat. Nos. 5,308,141 and 5,326,150 disclose a method for knitting one-piece covers for the base and/or back cushions of motor vehicle seats.

In the above-referenced U.S. patents, there is disclosed a method of forming integral tubular flaps which are knitted into the cover to serve as anchorage devices. The tubular flaps described in the above document generally extend in a course-wise direction in the knitted fabric.

U.S. Ser. No. 08/619,052, filed Mar. 20, 1996 now U.S. Pat. No. 5,711,169 and assigned to the assignee of this application, describes how a wale-wise extending tube can be knitted in weft knitted double jersey fabric. A weft knitted double jersey fabric may be machine knitted on a weft knitting machine having independently operable needles arranged in two needle beds, for example, a flat "V" bed machine. A wale-wise extending tubular portion can be formed between the two layers of the double jersey fabric by slipping stitches on selected needles so that there are no interlocking stitches between the two double jersey layers on particular needles lines, so forming a wale-wise extending tube.

However, there is to date no convenient means of producing a wale-wise extending flap in a central location in a knitted material. This is especially so for a three-dimensional knitted cover where the cover is dimensioned so as to be a substantially exact fit on the object to be covered.

SUMMARY OF THE INVENTION

Accordingly, there is provided a method of forming a knitted fabric upholstery cover for a core with a wale-wise extending flap on the reverse side of the fabric adjacent the core and a corresponding decorative seam on the external face of the cover, wherein the cover is knitted with excess material in a coursewise direction of knitting, and the excess material is gathered into a flap on the reverse side of the cover, which is sewn along its length adjacent the root thereof. The material for forming the flap may be outlined in the knitted stitches in the cover.

Conveniently where the upholstery cover is a double jersey weft knitted fabric, knitted on a weft knitting machine having needles arranged in two independently operative needle beds, a front needle bed and a rear needle bed, the fabric has a front layer knitted on one needle bed and a rear layer knitted on the other needle bed and the two layers are interconnected by knitted loops. The outline of the excess material to form the flap is formed in the rear layer only by knitting said outline in a contrasting manner.

The contrasting manner includes using a contrasting yarn and a different stitch structure which is visible on the rear face. Such a method is similar to that described in the assignee's U.S. Pat. No. 5,213,863.

Preferably, fold lines are formed in a respective layer to aid formation of the flap, the fold lines being formed by omitted stitches on particular needles on at least one of the respective needle beds.

These fold lines may comprise a groove in a respective layer of the double jersey structure formed by omitting stitches in said layer using stitch transfer techniques, or pressing off from particular needles.

Preferably, the knitted double jersey fabric has its front layer formed from a chenille yarn and its back layer formed from at least one non-chenille polyester yarn. The chenille yarn may be of the type disclosed in the assignee's U.S. Pat. No. 5,428,969. The chenille yarn may have a decitex in the range 1500 to 3000. Conveniently, the fabric has 8 to 16 wales per inch (2.54 cm) in a coursewise direction, and in the range of 8 to 30 courses per inch in the wale-wise direction, the chenille yarn being knitted into the fabric as knitted looped stitches.

The polyester yarn is preferably an air-texture polyester yarn having a decitex in the region 550 to 900, or 600 to 800, or 600 to 750, or 650 to 700 decitex. The chenille yarn may be formed of a pair of twisted nylon and/or polyester strands, for example, and may contain one or more low-melting point nylon strands which must be heat treated, or the pile may be moveable relative to the strands. The chenille yarn may have a count in the range 1500 to 3000 decitex. The chenille yarn is preferably one having moveable pile and/or an extensible core.

Preferably, the air textured polyester yarns are continuous filaments yarns having a count, in the unrelaxed state, of 680–750 decitex.

Preferably, the method of knitting is such that, in the relaxed state, the fabric has from 4 to 6 wales per cm.

The fabric may be knitted on a flat bed knitting machine having a pair of opposed needles beds. The machine may have a gauge in the range 10 to 16, preferably 10 to 14, further preferably 12. The machine may be a double system machine or a triple system or four system machine.

The present invention provides a method of knitting a cover, preferably an upholstery fabric, in which the knitting is carried out on a machine having a pair of opposed, independently operable needle beds, and in which the needles in each bed can be moved independently of one another in that bed into the path of an operating cam box reciprocating along the needle beds.

An upholstery fabric for a vehicle seat preferably has a weight in the relaxed state ready for use in excess of 500 g/m$^2$, preferably 500 to 900 g/m$^2$. This compared to traditional knitted products which have a weight of 300 to 350 g/m$^2$.

Preferably, the upholstery fabric is a weft knitted upholstery fabric formed of yarn having a decitex in the range 625 to 850 and having been knitted on a machine having a machine gauge in the range 10 to 18, the fabric being of generally double jersey construction.

Also according to the invention there is provided a machine knitted cover for a core which has a rear face which in use lies adjacent the core, a portion of the cover having a wale-wise extending flap on its rear face formed from knitted fabric gathered together to form the flap which is sewn along its length adjacent the root of the flap. The coursewise length of the cover is a sufficient length of fabric to form the flap without necessitating stretching the cover coursewise beyond its predetermined length to suit the portion of the core covered by said portion of the cover.

The knitted fabric to be gathered into the flap outlined is knitted fabric in the cover. Preferably, the fabric is a double jersey fabric and the fabric material to be gathered into the flap is marked on the rear layer of the double jersey layer in contrasting stitches which may be formed of a contrasting yarn or yarns or may be a different stitch construction.

The formation of the flap may be assisted by fold lines which are formed in at least one of the respective layers of the double jersey fabric, said fold lines comprising grooves.

The flap may have closed ends and has slits or apertures proximate the closed ends for the insertion of lengths of wire into the flap. These wires are used as anchorage means for helping secure the cover to the core, e.g., a car seat cushion cover to a molded squab.

The distance between the slits will be smaller than the overall length of the flap and the length of the wire to be located in the flap. The end of the wire may be turned over in a loop to prevent the wires from piercing the closed ends of the flap.

The flap may also have further apertures, preferably square-shaped apertures, spaced along its length to provide access for securing means, e.g., hog ring, to engage the wire located in the flap for securing the cover to the core.

BRIEF DESCRIPTION OF THE DRAWINGS

The invention will be described by way of example and with reference to the accompanying drawings in which:

FIG. 1 is an isometric view of an upholstered car seat cushion,

FIG. 3 is a cross-section taken through an aperture 56 of the flap depicted in FIG. 4.

DESCRIPTION OF THE PREFERRED EMBODIMENT

Figure 2:
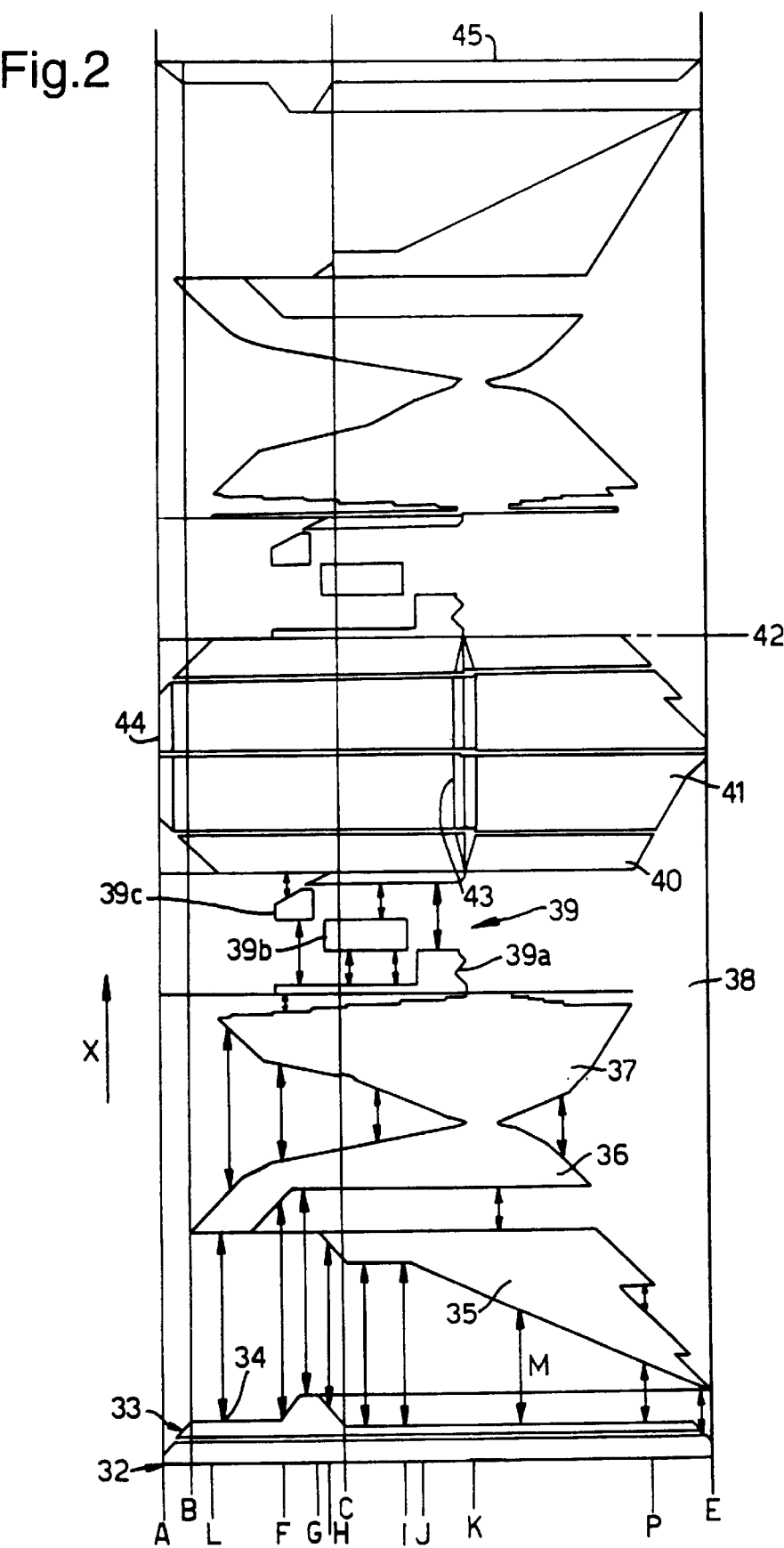
FIG. 2 is a knitting pattern of an automobile seat cover according to the present invention.

Referring to FIG. 1, there is shown a seat base 11 for a seat. The seat base 11 incorporates a three-dimensional foam core structure 12 over which a fabric cover 13 is stretched. The form core structure may be of any desired shape and, as shown, in the present example has wings 14. The fabric cover 13 is a three-dimensional knitted cover incorporating a central panel 15, side wings 16,17, a base and integrally knitted edge members 18 and 19 which are secured to the base of the seat in a known manner. The seat cover 13 may include decorative seams 20. Such seat bases are typically used in automobiles.

In order that the invention can be fully understood, reference will be made to a flat V-bed knitting machine. More details on such knitting machines are to be found in the publication "Dubied Knitting Manual," published by Edouard Dubied et Cie SA, Neu Chatel, Switzerland in 1967. Flat V-bed knitting machines are very well known and many such machines are now computer controlled. It has been proposed recently to manufacture upholstery fabric on such flat V-bed knitting machines and proposals have been made—see, for example, U.S. Pat. Nos. 5,308,141 and 5,326,150—to knit upholstery fabric suitable for use in vehicles.

The knitting of a fabric by the method according to the invention uses a Stoll CMS machine with 12 gauge needles. This machine is a flat V-bed machine of the type provided with a loop hold down device, such as a presser foot or sinker, to assist take-down of the knitted fabric. The machine can operate with a plurality of yarns feeds, each of which is associated with a respective cam box.

The cam box transverses across the needle beds with yarn carriers supplying yarn to the needles as desired in each direction of travel.

The fabric cover 13 is a double jersey weft knitted structure. Essentially such a double jersey structure comprises a pair of single jersey fabric layers formed of interconnected loops or stitches of yarn wherein the opposing pairs of layers are interconnected by further loops of yarn. It is possible to produce highly complex designs on the fabric structure by automatically controlling the operation of the knitting needles and particularly where two or three colors of yarn are used. Normally, such fabrics would be knitted with a jacquard knitting machine in which the colors of the face of the fabric can be determined by suitable needle selection.

Conveniently, it is only the technical face of the fabric which has to have the attractive appearance. The technical reverse of the fabric, either being covered with a reinforcing or padding layer or being directly in contact with the core 12 of the upholstered product, is of no particular interest to the eventual consumer.

The fabric cover 13 is a double jersey weft knitted structure having a technical face effectively comprising a series of loops in a front layer 21 of fabric formed on one needle bed of a knitting machine and a technical reverse, or rear, face 23 (FIG. 3) formed on series of loops in a rear layer of fabric formed on the second needle bed of the knitting machine.

Referring to FIGS. 5–9B, there are shown stitch diagrams in which each row represents a row of knitting on one pass of the yarn carrier. In each row the upper line of small dots represents individual needles on the rear needle bed (R) of a knitting machine, and the lower row of dots represents the needles of the front needle bed (F) of the knitting machine. In the terminology used herein, the front layer 21 of the fabric 13 is knitted on the front needle bed and the rear layer 23 of fabric is knitted on the rear needle bed. The yarn is represented by loops and interconnecting cross-links. It will be appreciated that the stitch diagrams represent only a small portion of the cover as is required for illustrating the invention.

Referring to FIG. 2, there is shown a knitting pattern for a weft knitted fabric cushion cover 13 which is knitted in the direction of arrow X that is from the bottom towards the top.

The two lines A–E represent the working length of the two opposed needles beds of the machine on which the cover is knitted. The needles operate to form fabric along vertical needles lines, that is in wales, course-by-course.

The knitting of a complex three-dimensional seat cover is described in detail in U.S. Pat. No. 5,308,141 and its continuation-in-part U.S. Pat. No. 5,326,150, the contents of which are hereby incorporated into the present application. The knitting of the fabric cover will only be described herein as is necessary for an understanding of a present invention. The knitting begins on all needles between A–E on the needle beds to form the double jersey set-up courses 32. The two needle beds then each separately knit a single jersey layer to form a coursewise extending tube 33 with needles being made progressively active or deactivated or held up to achieve the desired shape.

After completion of the coursewise extending tube 33, the needles between the needle lines B and C begin to knit a double jersey area 34. On completion of this area, the yarn carrier moves to the needle line E and begins to knit the jacquard area 35.

During the continuous knitting operation from bottom to top of the fabric, edges of the fabric between which double-ended arrows are located are knitted together. Taking the two edges indicated by double-headed arrows M, for example, this requires that needles made inactive between the point C and E, during knitting of the fabric area 34, are progressively reactivated from E to C coursewise to "join" the two edges indicated by along vertical lines M.

Double jersey jacquard areas 35, 34, 37 are formed by knitting on both needle beds up to course 38. The needles on the front needle bed are then held up while knitting continues on the rear needle bed to form an integral single jersey anchorage tube 39 of the type described in U.S. Pat. Nos. 5,308,141 and 5,326,150.

The anchorage tube 39 has apertures formed therein for the attachment of securing means, e.g., hog rings, and is therefore formed by knitting on blocks of adjacent needles on the rear needle bed while the other needles of the rear bed are help up.

As shown, all the needles on the rear bed between lines F and K knit several courses of single jersey fabric. The needles between F and I are held up while knitting continues on needles between lines J and K for several courses, preferably four or five courses, to form the block 39a. The needles between lines J and K and F and G are then held up, and knitting recommences on the needles between H and I for several courses to form the block 39b. The needles between H and K are then held up while knitting recommences between lines F and G for several courses to form the block 39c. Thereafter, knitting commences on the needles between G and K up to course 40 to complete the tube 39. The single jersey tube is shown by the dark areas between courses 38 and 40.

From course 40 onwards, knitting recommences on both needle beds between lines L and P to form a double jersey jacquard area 41 joining the area 37. The area 37 forms a wing 16 or 17 of the seat cover 13, and the double jersey area 41 forms the central panel 15 of the cover 13.

The central panel 41 is knitted between courses 40 and 42 and includes an area of excess fabric 43 which in use is for forming a wale-wise extending flap 50 (see FIG. 3) on the rear face of the cover 13. The coursewise length of the central panel 41 between needles lines A–E is longer than the corresponding surface length of the seat cushion core 12 to be covered so that the knitted material can be gathered to form the flap 50 and leave a sufficient coursewise length of fabric for covering the cushion core without stretching the central panel 15 of the fabric cover beyond its predetermined length for covering the core.

The formation of the flap 50 within the cover should not detract from the overall appearance and unity of the cover. This is particularly so when the flap is located in the center of a panel.

A wale-wise tube 44 is formed at the front edge of the panel 41 by removing the interlocking stitches between the two double jersey layers.

After knitting of the central panel 41, the knitted process continues in the reverse mode to that described between courses 32 and 40, eventually terminating in the coursewise extending tube 45 at the upper end of the cover. The final few courses are knitted in double jersey construction and include a fusible thread to prevent subsequent unravelling after being knitted off.

Figure 4:
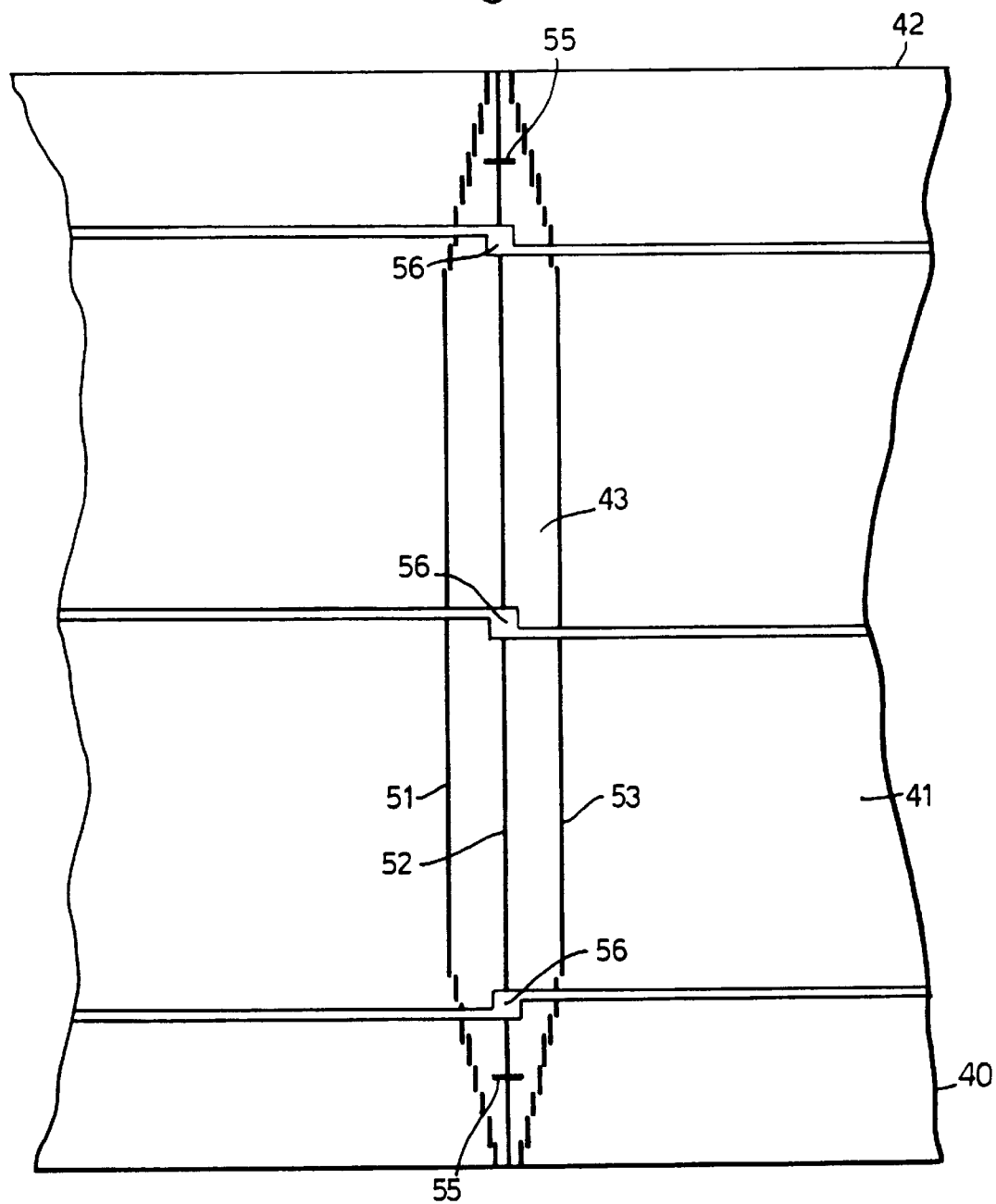
FIG. 4 is an expanded view of a portion of the pattern for the fabric to be gathered into a wale-wise extending flap.

Referring to FIG. 4, there is shown an enlarged view of the excess fabric flap area 43 which is formed in the central panel 41 for formation of the flap 50. The knit diagrams shown in FIGS. 5 to 9 illustrate how particular features can be incorporated into the flap area 43.

In general, each diagram is divided into four zones, I, II, III and IV. Zones I and IV which lie outside of the needle lines X and Z are the jacquard regions of the panel 41, and the zones II and III which lie respectively between needle lines X and Y and needles Y and Z correspond to the material of the flap area 43. The lines X, Y and Z correspond with the contrast lines 51, 52 and 53 formed on the central panel 41 to highlight the fold lines in the fabric when the flap 50 is formed. The arrows show the direction of travel of the yarn carrier in each course.

Figure 5:
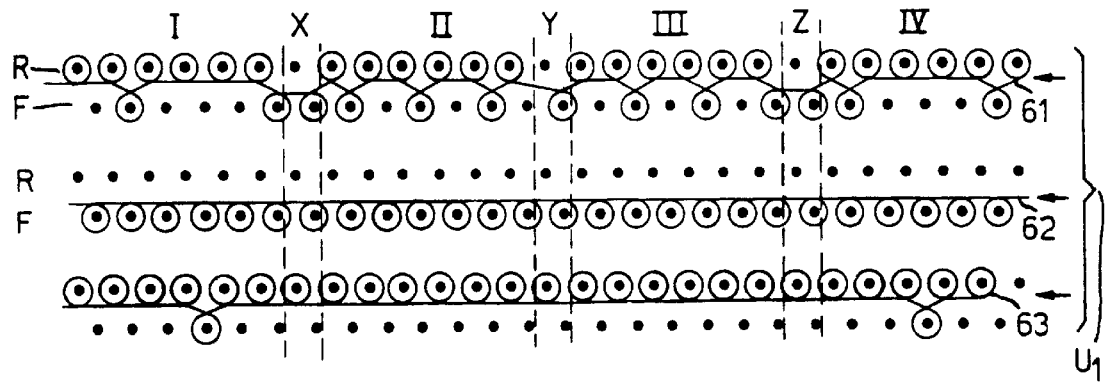
FIGS. 5, 6, 7A, 7B, 8A, 8B, 9A and 9B are knitting diagrams illustrating various techniques employed in knitting of the flap material.

As the fabric is knitted, FIG. 5 illustrates the method of forming the contrasting lines 51, 52 and 53. The yarn carrier travels from right to left to knit one course of fabric. The upper row of dots represents the rear needle bed R, and the lower row of dots represents the front needle bed F. For each pass of the yarn carrier, three yarns are knitted on the needles: a first contrast yarn 61, a chenille yarn 62, and a second contrast yarn 63. The first contrast yarn 61 is knitted on all the needles on the rear needle bed except for three needles in needle lines X, Y and Z, with some stitches being made on the front needle bed to provide some interlock between the double jersey layers. The chenille yarn 62 is knitted on all needles on the front needle bed only. The second contrast yarn is on all needles on the rear needle bed with some stitches made on the front needle bed again for locking together with two double jersey layers. This forms a repeat unit $U_1$. The next pass of the yarn carriers from right to left will knit the next repeat unit $U_1$., and so on.

The rear layer of the knitting will be formed with contrast lines 51, 52, 53 visible as a single wale of the second contrast yarn 63 on the rear face of the knitted fabric.

As the fabric is knitted, the width of the zone II and zone III may vary to suit the desired location of the contrast lines 51,53.

Figure 6:
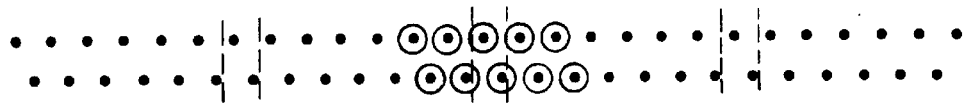
Figure 7A:
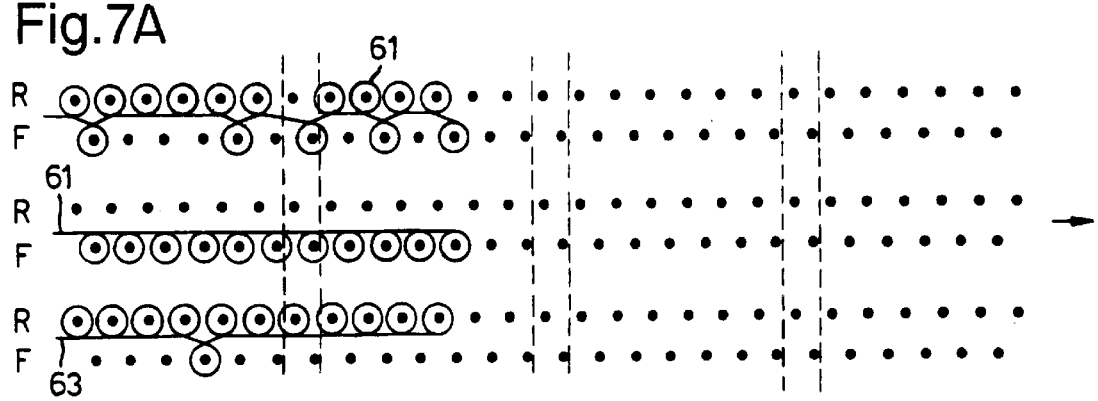
Figure 7B:
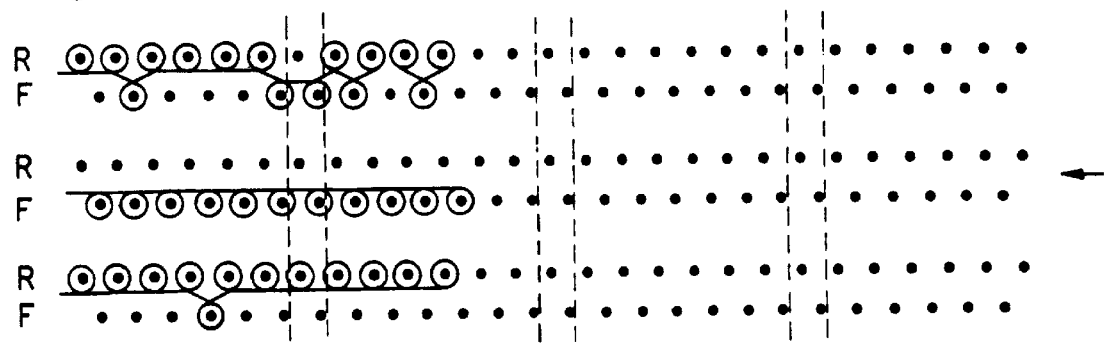
Figure 8A:
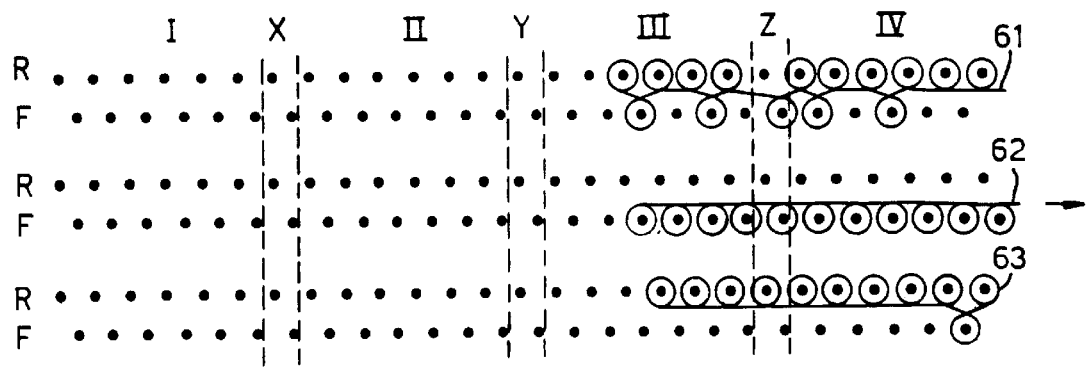
Figure 8B:
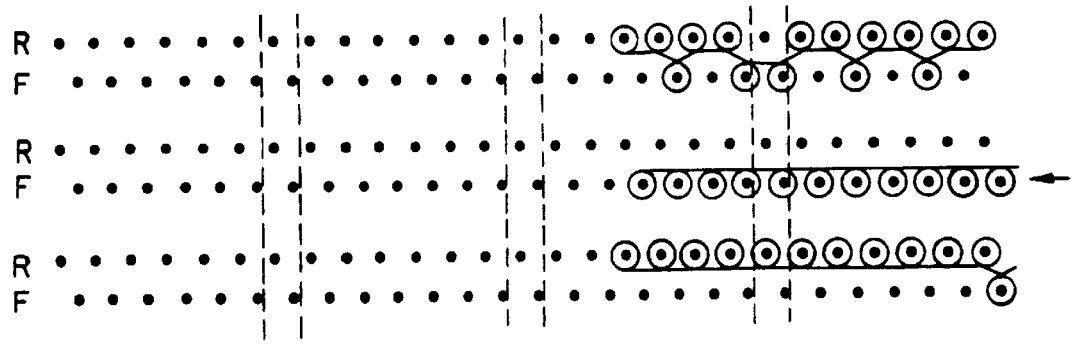

Referring to FIG. 6, a coursewise extending slit 55 can be formed at each closed end of the flap 50 by pressing-off a selected group of needles, preferably five needles on the front and rear needle beds, as shown, for a single course of knitting. In this case, the selected needles straddle the central needle line Y. The repeat unit $U_1$., would then again be subsequently knitted on the next successive course.

If desired, not to form a slit 55, but to form a separate aperture 56 of which there are three shown spaced wale-wise along the flap area 43, then as before a selected group of needles is pressed off both front and rear needle beds in the center straddling the needle line Y. The fabric is then knitted on one side only of the pressed-off needles for four courses in zones I and II on both needle beds (see FIGS. 7A and 7B) with the needles in zone III and IV held up. The needles in zones I and II are then held up while knitting then recommences on needles in zones III and IV on the other side of the pressed-off needles for four courses (see FIGS. 8A and 8B). The next course is then a repeat unit $U_1$., of the type shown in FIG. 5, which closes the aperture by forming its upper side.

Figure 9A:
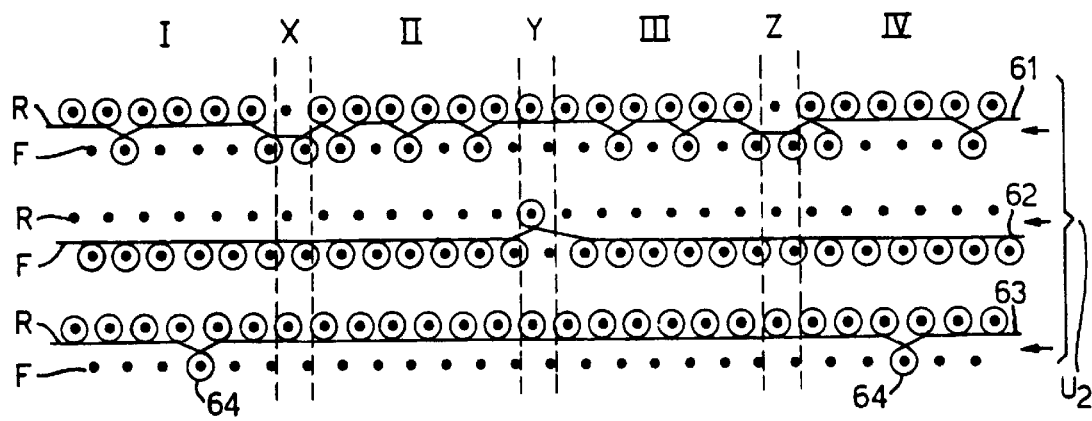
Figure 9B:
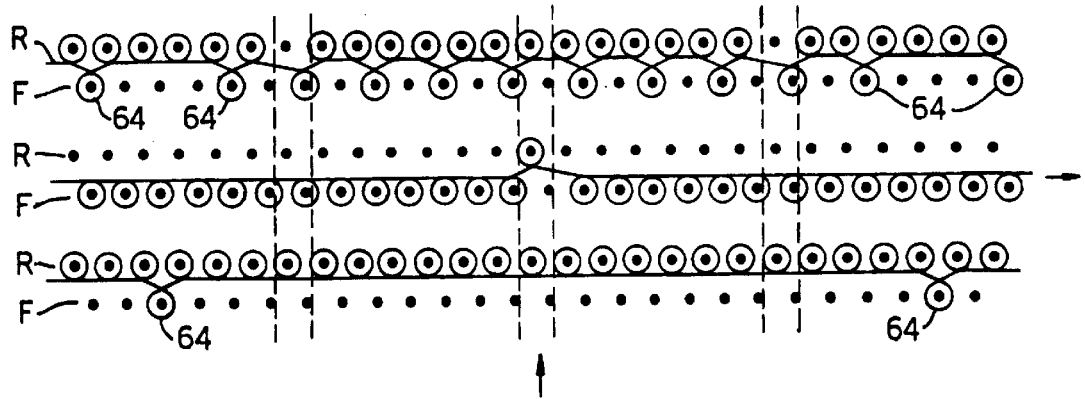

Referring to FIG. 9, there is illustrated a means of providing a fold line 91 (see FIG. 3) in a layer of the double jersey knitted fabric.

The knitted course repeat unit $U_2$, formed by the yarn carrier moving from right to left is very similar to the repeat unit $U_1$ except that the first contrast yarn 61 is also knitted on the needle Y on the rear bed and not on the front bed, the chenille yarn 62 is knitted on the needles in the front bed except for needle Y where it is knitted on the rear needle bed, and the second contrast yarn 63 is knitted on all the needles of the rear needle bed. Thus, the needle Y of the first layer remains empty.

The next pass of the yarn carrier from left to right repeats the repeat unit $U_2$ except for the interlock stitches 64 between the two double jersey layers being formed on the adjacent needles of the front bed.

The resultant build-up of a number of courses will cause a groove line 91 to be formed along the front face of the fabric, allowing the fabric to bend easily along the crease, thus forming the flap 50. This is shown in FIG. 3.

Thus, the area 43 is built up using the above techniques, and the excess fabric is gathered into a wale-wise extending flap 50 which is sewn at its root along a sew line 57 forming a visible seam 20 in the outer face of the cover.

An anchorage wire 58 may be inserted into the flap 50 through a slit 55. The aperture 56 can accommodate the passage of anchorage rings 59, sometimes called hog rings.

We claim:

1. A method of forming a machine weft knitted double jersey structure fabric upholstery cover for a core, said cover having a front layer, a rear layer, an external face, a reverse face intended to lie against said core, and a wale-wise extending flap, said flap being formed on the reverse face of the fabric cover, said flap having a root portion and a corresponding decorative seam on the external face of the cover, said method comprising knitting excess fabric in said front and rear layers with respect to the intended size of the cover in the coursewise direction of said knitting for the reverse side of the cover and outlining said excess fabric for said flap by knitting contrasting stitches in the reverse face, gathering said excess fabric into a flap on the reverse side of the cover with a root portion of the flap at the adjacent cover fabric and sewing said flap along its length at the root portion thereof to form said flap and said seam.

2. A method as claimed in claim 1 comprising knitting the upholstery cover as a double jersey weft knitted fabric on a weft knitting machine having needles arranged in two independently operative needle beds, a front needle bed and a rear needle bed, the fabric having said front layer knitted on one needle bed and said rear layer knitted on the other needle bed; and interconnecting the two layers by knitted loops.

3. A method as claimed in claim 2 comprising knitting fold lines in a respective layer to aid formation of the flap, the fold lines being formed by omitting stitches on particular needles on at least one of the respective needle beds.

4. A method as claimed in claim 3 wherein the omitted stitches are transferred to an adjacent needle during the knitting process.

5. A machine weft knitted double jersey structure fabric cover for a core, said fabric cover having a front layer, a rear layer, a reverse face which in use lies adjacent the core, and an external face, a portion of the cover having a wale-wise extending flap on its reverse face and a decorative seam in its external face opposite said flap, said flap being formed from said front and rear layers of knitted fabric gathered together to form the flap which is sewn along its length adjacent the cover, the material of said flap being outlined by contrasting stitches in said rear face, the coursewise length of the cover being a sufficient length of fabric to form the flap without necessitating stretching the cover coursewise beyond its predetermined length to suit the portion of the core covered by said portion of the cover.

6. A cover as claimed in claim 5 wherein the cover comprises a double jersey structure knitted fabric and in order to assist the gathering of the knitted fabric into said flap fold lines are formed in the respective layers of the double jersey structure, said fold lines comprising grooves in at least one of the respective layers of the double jersey structure formed by the omission of stitches in said respective layer.

7. A cover as claimed in claim 5 where the flap has opposite ends which are closed, and has a slit or aperture proximate each closed end to permit insertion of a length of wire into the flap, said slits or apertures being spaced apart by a distance which is shorter than the length of wire to be inserted into the flap.

8. A cover as claimed in claim 7 wherein the flap has further apertures spaced along its wale-wise length to provide access for securing means to engage said length of wire to anchor the cover to the core.

* * * * *

UNITED STATES PATENT AND TRADEMARK OFFICE
CERTIFICATE OF CORRECTION

PATENT NO : 5,887,452

DATED : March 30, 1999

INVENTOR(S) : STUART THOMAS SMITH

It is certified that error appears in the above-identified patent and that said Letters Patent are hereby corrected as shown below:

Column 8, Line 6, Claim 4: delete "wherein" and insert --comprising transferring--.

Column 8, Line 7, Claim 4: delete "are transferred".

Signed and Sealed this

Twenty-first Day of September, 1999

Attest:

Q. TODD DICKINSON

*Attesting Officer*      *Acting Commissioner of Patents and Trademarks*